United States Patent
Whitney et al.

(10) Patent No.: US 12,379,199 B2
(45) Date of Patent: Aug. 5, 2025

(54) VERNIER SCAN ARCHITECTURE FOR SELF-MIXING INTERFEROMETRY PHASE MEASUREMENTS

(71) Applicant: Apple Inc., Cupertino, CA (US)

(72) Inventors: William Whitney, Cupertino, CA (US); Mengshu Huang, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 1001 days.

(21) Appl. No.: 17/471,068

(22) Filed: Sep. 9, 2021

(65) Prior Publication Data

US 2023/0070733 A1 Mar. 9, 2023

(51) Int. Cl.
- G01B 9/02 (2022.01)
- G01S 7/4912 (2020.01)
- G01S 17/58 (2006.01)

(52) U.S. Cl.
CPC ........ G01B 9/02092 (2013.01); G01S 7/4916 (2013.01); G01S 17/58 (2013.01)

(58) Field of Classification Search
CPC ... G01B 9/02092; G01S 7/4916; G01S 17/58; G01P 3/36
See application file for complete search history.

(56) References Cited

U.S. PATENT DOCUMENTS

| | | | |
|---|---|---|---|
| 6,014,239 | A | 1/2000 | Veligdan |
| 7,507,203 | B2 | 3/2009 | Sebastian et al. |
| 8,823,775 | B2 | 9/2014 | Xu et al. |
| 8,824,706 | B2 | 9/2014 | Stephanou et al. |
| 9,741,344 | B2 | 8/2017 | Bakish |
| 10,555,079 | B2 | 2/2020 | Bakish |
| 10,824,275 | B2 | 9/2020 | Mutlu et al. |
| 11,029,442 | B2 | 6/2021 | Mutlu et al. |
| 11,473,898 | B2 | 10/2022 | Mutlu et al. |

(Continued)

FOREIGN PATENT DOCUMENTS

| | | |
|---|---|---|
| CN | 105092014 | 11/2015 |
| CN | 111045028 | 4/2020 |

OTHER PUBLICATIONS

Kwan et al., "Demosaicing of Bayer and CFA 2.0 Patters for Low Lighting Images," *Electronics*, 2019, vol. 8, No. 1444, pp. 1-58.

(Continued)

*Primary Examiner* — Yuqing Xiao
*Assistant Examiner* — Chia-Ling Chen
(74) *Attorney, Agent, or Firm* — Brownstein Hyatt Farber Schreck, LLP

(57) ABSTRACT

A method of estimating a velocity of an object using an SMI sensor. The method includes driving a light emitter of the SMI sensor with a chirped waveform. The chirped waveform includes a first chirp and a second chirp separated by a first time interval, and a third chirp separated from the second chirp by a second time interval. The method also includes deriving a frequency-based velocity from an output of the SMI sensor; generating a first comb of possible velocities in response to analyzing an output of the SMI sensor generated in response to the first chirp and the second chirp; generating a second comb of possible velocities in response to analyzing an output of the SMI sensor generated in response to the second chirp and the third chirp; and determining a velocity of the object using the first comb, the second comb, and the frequency-based velocity.

20 Claims, 12 Drawing Sheets

(56) References Cited

U.S. PATENT DOCUMENTS

| | | |
|---|---|---|
| 11,877,105 B1 | 1/2024 | Manokhin |
| 2012/0002189 A1* | 1/2012 | Bengoechea Apezteguia ............ G01F 1/661 356/28.5 |
| 2012/0306823 A1 | 12/2012 | Pance |
| 2016/0320173 A1* | 11/2016 | Royo Royo .......... G01B 9/0207 |
| 2017/0150254 A1 | 5/2017 | Bakish et al. |
| 2018/0209892 A1* | 7/2018 | Van Der Lee ........ G01S 7/4817 |
| 2018/0233129 A1 | 8/2018 | Bakish et al. |
| 2019/0090068 A1 | 3/2019 | Fishman et al. |
| 2019/0110040 A1 | 4/2019 | Doyen et al. |
| 2019/0253608 A1 | 8/2019 | Lee et al. |
| 2019/0313178 A1* | 10/2019 | Mutlu .................. H04R 1/1016 |
| 2021/0010797 A1 | 1/2021 | Cihan et al. |
| 2022/0082369 A1* | 3/2022 | Spruit ................ G01B 9/02007 |
| 2022/0155052 A1 | 5/2022 | Mutlu et al. |
| 2023/0083807 A1 | 3/2023 | Tal et al. |
| 2023/0417536 A1 | 12/2023 | Cihan et al. |
| 2024/0029752 A1 | 1/2024 | Tal et al. |

OTHER PUBLICATIONS

Nie et al., "Deeply Learned Filter Response Functions for Hyperspectral Reconstruction," 2018 IEEE/CVF Conference on Computer Vision and Pattern Recognition, Salt Lake City, Utah, 2018, pp. 4767-4776.

Paschotta, "Optical Heterodyne Detection," *Encyclopedia of Laser Physics and Technology*, 1st edition, Oct. 2008, Wiley-VCH, ISBN 978-3-527-40828-3; pp. 1-8.

Rogers et al., "A universal 3D imaging sensor on a silicon photonics platform," *Nature*, Feb. 11, 2021, vol. 590, 18 pages.

Sun et al., "Large-scale nanophotonic phased array," *Nature*, Jan. 10, 2013, vol. 293, Nature, pp. 195-199.

Steinacher, "Balanced Photo-Detector (BPD) Physics Basel SP1'023)," User's Manual, Revision 1.3, Apr. 2017, 5 pages.

* cited by examiner

VERNIER SCAN ARCHITECTURE FOR SELF-MIXING INTERFEROMETRY PHASE MEASUREMENTS

FIELD

The described embodiments relate to determining a velocity or range of an object and, more particularly, to determining the velocity or range of an object using a self-mixing interferometry (SMI) sensor.

BACKGROUND

Sensors are included in many of today's electronic devices, including electronic devices such as smartphones, computers (e.g., tablet computers or laptop computers), wearable electronic devices (e.g., electronic watches, smart watches, or health or fitness monitors), game controllers, navigation systems (e.g., vehicle navigation systems or robot navigation systems), earbuds, headphones, and so on. Sensors may variously sense the presence of objects, distances to objects, proximities of objects, movements of objects (e.g., whether objects are moving, or the speed, acceleration, or direction of movement of objects), compositions of objects, and so on. One useful type of sensor is the SMI sensor.

Given the wide range of sensor applications, any new development in the configuration or operation of a sensor can be useful. New developments that may be particularly useful are developments that reduce the cost, size, complexity, part count, or manufacture time of the sensor, or developments that improve the sensitivity or speed of sensor operation.

SUMMARY

Embodiments of the systems, devices, methods, and apparatus described in the present disclosure are directed to a Vernier scan architecture for collecting SMI phase measurements and determining the velocity or range of an object on which a beam of light emitted by an SMI sensor impinges.

In a first aspect, the present disclosure describes an electronic device. The electronic device may include a housing, an SMI sensor, a drive circuit, and a processor. The SMI sensor may include a light emitter and be mounted to the housing. The light emitter may be configured to emit a beam of light from a resonant cavity of the light emitter, receive a returned portion of the beam of light into the resonant cavity, and produce an SMI signal indicative of a mixing of light within the resonant cavity. The drive circuit may be operable to drive the light emitter with a chirped waveform. The processor may be configured to derive a frequency-based velocity of an object from the SMI signal. The processor may also be configured to use first portions of the SMI signal containing a response to a first pair of chirps in the chirped waveform, the first pair of chirps separated by a first time interval, to measure a first phase difference between the chirps and generate a first comb of possible velocities of the object. The processor may also be configured to use second portions of the SMI signal containing a response to a second pair of chirps in the chirped waveform, the second pair of chirps separated by a second time interval, measure a second phase difference between the chirps and generate a second comb of possible velocities of the object. The processor may be further configured to determine the velocity of the object using the first comb of possible velocities, the second comb of possible velocities, and the frequency-based velocity.

In a second aspect, the present disclosure describes a method of estimating a velocity of an object using a self-mixing interferometry (SMI) sensor including a light emitter. The method may include driving the light emitter with a waveform including a series of chirps, the series of chirps including a first chirp and a second chirp separated by a first time interval, and a third chirp separated from the second chirp by a second time interval different from the first time interval. The method may further include deriving a frequency-based velocity from an output of the SMI sensor; generating a first comb of possible velocities in response to analyzing an output of the SMI sensor generated in response to the first chirp and the second chirp; generating a second comb of possible velocities in response to analyzing an output of the SMI sensor generated in response to the second chirp and the third chirp; and determining a velocity of the object using the first comb of possible velocities, the second comb of possible velocities, and the frequency-based velocity.

In addition to the exemplary aspects and embodiments described above, further aspects and embodiments will become apparent by reference to the drawings and by study of the following description.

BRIEF DESCRIPTION OF THE DRAWINGS

The disclosure will be readily understood by the following detailed description in conjunction with the accompanying drawings, wherein like reference numerals designate like structural elements, and in which.

Figure 1A:
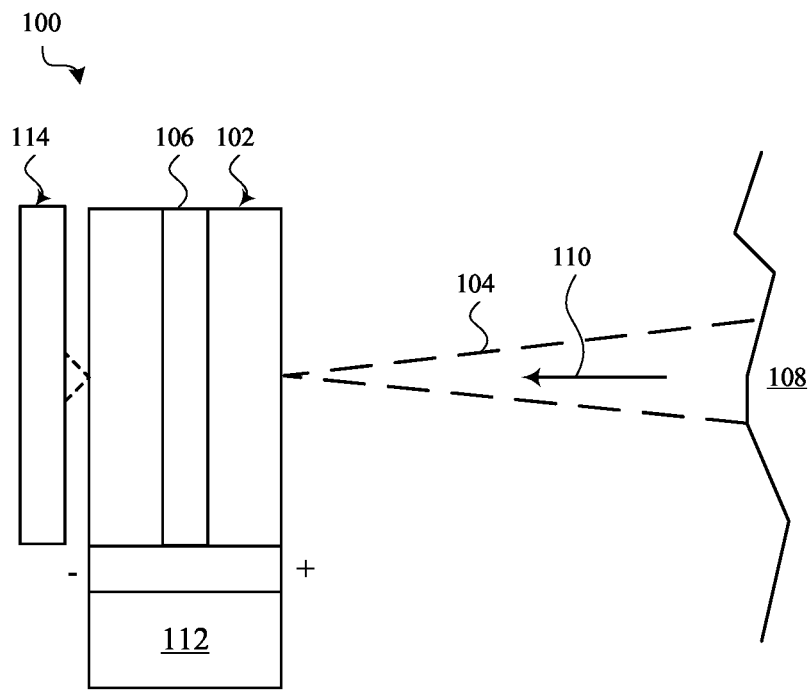
FIGS. 1A and 1B show example SMI sensors.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof), and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Reference will now be made in detail to representative embodiments illustrated in the accompanying drawings. It should be understood that the following description is not intended to limit the embodiments to one preferred embodiment. To the contrary, it is intended to cover alternatives, modifications, and equivalents as can be included within the spirit and scope of the described embodiments as defined by the appended claims.

Coherent optical sensing is a powerful tool to probe spatial and velocity information of arbitrary targets. Coherent optical sensing can provide as granular as optical wavelength resolution, quantum-limited signal levels, and fundamental resistance to external aggressors (e.g., resistance to solar or coexistence tonal noise) via signal modulation.

SMI sensing is a monolithic coherent sensing architecture where the resonant cavity of a light emitter (e.g., a VCSEL) serves as a local mixer for homodyne and heterodyne detection of a target. SMI sensing provides significant miniaturization and efficiency for coherent sensing.

A typical SMI sensing architecture transmits a modulated signal to a target, then estimates the target's distance and velocity by processing the frequencies and amplitudes of the returned signal. The phase of the returned signal can be used as well, and can provide a dramatic enhancement in measurement precision. However, as phase is only defined as modulo $2\pi$, the correct phase rollover domain (i.e., the correct domain of phase measurements) must first be determined.

Described herein is a scan plan architecture and associated processor that use a novel phase disambiguation technique to enable phase-based SMI measurements for enhanced SMI sensing precision. The scan plan architecture relies on an SMI sensor drive waveform that consists of a series of chirps at varied intervals. For any two chirps, the measured phase difference in the FFT bin containing the target signal yields a "comb" of possible velocity solutions corresponding to the various possible phase rollover domains, with a velocity solution spacing that is inversely proportional to the time interval between the two chirps.

In general, a second (e.g., frequency-based) measurement may be used to resolve the phase rollover ambiguity and select the "true" velocity from the "comb" of possible velocities. However, this second measurement is typically challenged by precision requirements due to various aggressors, risking phase rollover errors in the determined velocity (e.g., an error due to selection of a velocity that is off by one or more multiples of the velocity solution spacing).

As described herein, multiple pairs of chirps at varied intervals may be used to generate multiple corresponding velocity solution "combs," with varied spacings, that align only at a reduced number of shared solutions, significantly reducing the precision requirement of the second measurement.

The above and other embodiments and techniques are described with reference to FIGS. 1A-9. However, those skilled in the art will readily appreciate that the detailed description given herein with respect to these figures is for explanatory purposes only and should not be construed as limiting.

Directional terminology, such as "top", "bottom", "upper", "lower", "front", "back", "over", "under", "above", "below", "left", "right", etc. is used with reference to the orientation of some of the components in some of the figures described below. Because components in various embodiments can be positioned in a number of different orientations, directional terminology is used for purposes of defining relative positions of various structures, and not absolute positions. For example, a first structure described as being "above" a second structure and "below" a third structure is also "between" the second and third structures, and would be "above" the third structure and "below" the second structure if the stack of structures were to be flipped. Also, as used herein, the phrase "at least one of" preceding a series of items, with the term "and" or "or" to separate any of the items, modifies the list as a whole, rather than each member of the list. The phrase "at least one of" does not require selection of at least one of each item listed; rather, the phrase allows a meaning that includes at a minimum one of any of the items, and/or at a minimum one of any combination of the items, and/or at a minimum one of each of the items. By way of example, the phrases "at least one of A, B, and C" or "at least one of A. B. or C" each refer to only A, only B, or only C; any combination of A, B, and C; and/or one or more of each of A, B, and C. Similarly, it may be appreciated that an order of elements presented for a conjunctive or disjunctive list provided herein should not be construed as limiting the disclosure to only that order provided.

FIG. 1A shows a first example SMI sensor 100. The SMI sensor 100 includes a light emitter 102 configured to emit a beam of light 104 from a resonant cavity 106 of the light emitter 102. The beam of light 104 may impinge on an object 108, and a portion 110 of the beam of light 104 may be reflected back toward the light emitter 102 and received into the resonant cavity 106. Light generated by the light emitter 102 within the resonant cavity 106 may mix (self-mix) with light that is received back into the resonant cavity 106, and may produce an SMI signal indicative of the mixing of light within the resonant cavity 106.

A drive circuit 112 may be operable (e.g., by a processor or other circuitry) to drive the light emitter 102 with a drive waveform (e.g., a drive current or, alternatively, a drive voltage). The drive waveform may include one or more of a direct current (DC) waveform, a modulated waveform (e.g., a frequency-modulated continuous-wave (FMCW) waveform, such as a triangularly-modulated waveform), a harmonic driven waveform (e.g., an IQ-modulated waveform), and so on.

The SMI signal may be measured (e.g., amplified and sampled) in various ways. For example, in some cases, and as shown, the SMI sensor 100 may include a photodetector 114. A portion of the self-mixed light may impinge on the photodetector 114 and be converted to a photocurrent. The photocurrent may contain the SMI signal. The photodetector 114 may be stacked above or below the light emitter 102, or may be positioned laterally adjacent the light emitter. Alternatively, a circuit may be provided to sense the junction voltage or current of the light emitter 102, which junction voltage or current may carry the SMI signal.

The light emitter 102 may be one or more of a vertical-cavity surface-emitting laser (VCSEL), a vertical external-cavity surface-emitting laser (VECSEL), a quantum-dot laser (QDL), a quantum cascade laser (QCL), or a light-emitting diode (LED) (e.g., an organic LED (OLED), a resonant-cavity LED (RC-LED), a micro LED (mLED), a superluminescent LED (SLED), or an edge-emitting LED), and so on. The generated, emitted, and received light may include, for example, visible light (e.g., green light, or red light, and so on) or non-visible light (e.g., infrared (IR) light, ultraviolet (UV) light), and so on.

Figure 1B:
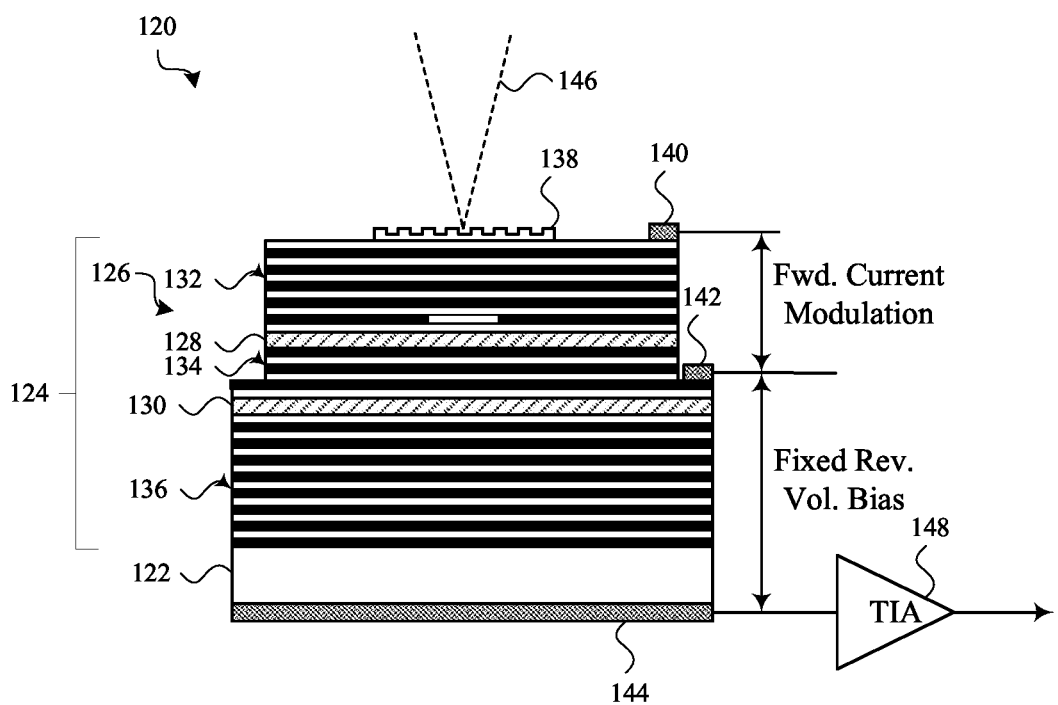

FIG. 1B shows a second example SMI sensor 120. The SMI sensor 120 is an example of the SMI sensor described with reference to FIG. 1A. The SMI sensor 120 includes a semiconductor substrate 122 on which a set of epitaxial layers 124 is formed. The set of epitaxial layers 124 defines a light emitter (e.g., a semiconductor laser 126) having a first multiple quantum well (MQW) structure 128. In some cases, the semiconductor laser 126 may be configured as a VCSEL. The set of epitaxial layers 124 also defines a second MQW structure 130. The first and second MQW structures 128, 130 may be formed within a distributed Bragg reflector (DBR) defined by the set of epitaxial layers 124. The DBR may include first, second, and third portions 132, 134, 136. The first MQW structure 128 may be formed between the first and second portions 132, 134 of the DBR, and the second MQW structure 130 may be formed between the second and third portions 134, 136 of the DBR. The first portion 132 of the DBR and/or the second and third portions 134, 136 of the DBR may be partially transmissive, or have an aperture, to allow light generated by the semiconductor laser 126 to escape from the set of epitaxial layers 124.

The first MQW structure 128, together with the DBR portions 132, 134, 136, may form a first resonant cavity, and in some cases may form a VCSEL. The second MQW structure 130, in combination with its neighboring DBR portions (e.g., 134/136) may form a second cavity, and in some cases may function as a resonant cavity photodetector (RCPD).

Optionally, a grating 138 or lens may be formed or deposited on an emission surface of the semiconductor laser 126 (or a coating or a surface treatment may be applied to the emission surface).

The first MQW structure 128 may be disposed between first and second electrodes 140, 142, such as a first electrode 140 disposed on a first (or upper) epitaxial layer in the set of epitaxial layers 124, and a second electrode 142 disposed on a second epitaxial layer in the set of epitaxial layers 124 (e.g., an epitaxial layer disposed between the first and second MQW structures 128, 130).

The second MQW structure 130 may be disposed between the second electrode 142 and a third electrode 144. The third electrode 144 may be formed on a side of the semiconductor substrate 122 opposite a side of the semiconductor substrate 122 on which the set of epitaxial layers 124 is formed.

In operation, the first MQW structure 128 may be forward-biased by a fixed or modulated drive current applied to the first electrode 140 by a drive circuit, and may be caused to generate visible or non-visible light (i.e., lase). The second electrode 142 may be grounded or held at a fixed potential. The generated light may be emitted from the first MQW structure 128. If the emitted light 146 reflects or scatters off of an object (e.g., a surface, a user, or a particle), a portion of the reflected or scattered light may be reflected or scattered toward the semiconductor laser 126, and may be received back into (or returned to) the first MQW structure 128. When this occurs, the returned portion of the emitted light 146 may self-mix with the light that is generated by the first MQW structure 128. The self-mixing leads to changes in the emitted light 146, which changes can be detected by reverse-biasing the second MQW structure 130 with a fixed voltage bias (i.e., the second MQW structure 130 may be reverse-biased and operated as a photodetector (PD)); sensing a photocurrent generated by the second MQW structure 130 (e.g., a photocurrent generated at the third electrode 144); and extracting an SMI signal from the photocurrent. In some cases, the photocurrent may be received and amplified by a transimpedance amplifier (TIA) 148, and the output of the TIA 148 may be converted to a digital value by an analog-to-digital converter (ADC). In some cases, the output of the TIA 148 may be additionally amplified, filtered, or otherwise processed prior to being converted to a digital value.

Figure 2:
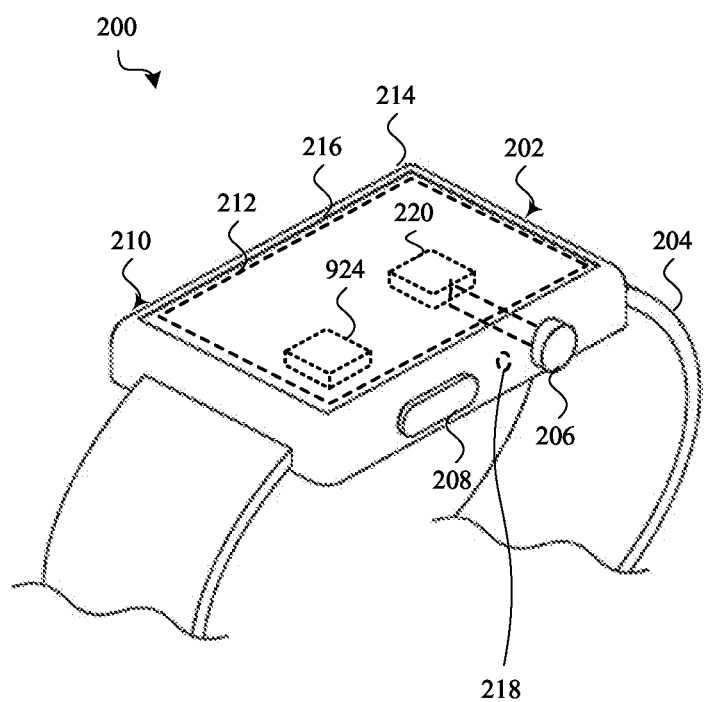
FIGS. 2-4 show various example electronic devices that include an SMI sensor.
Figure 3:
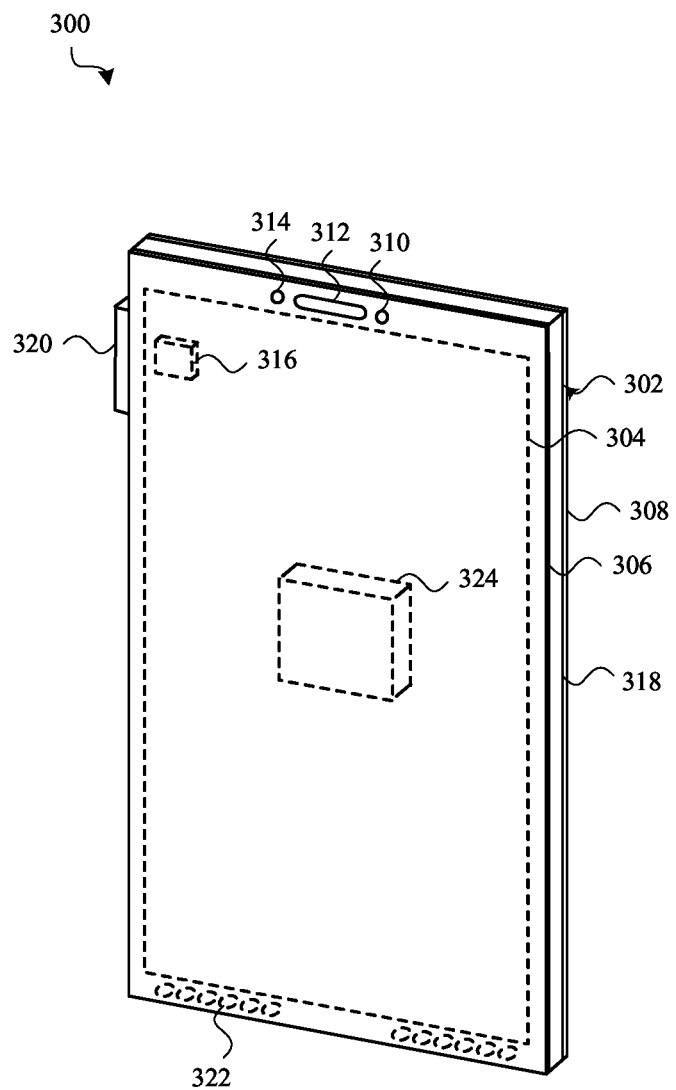
Figure 4:
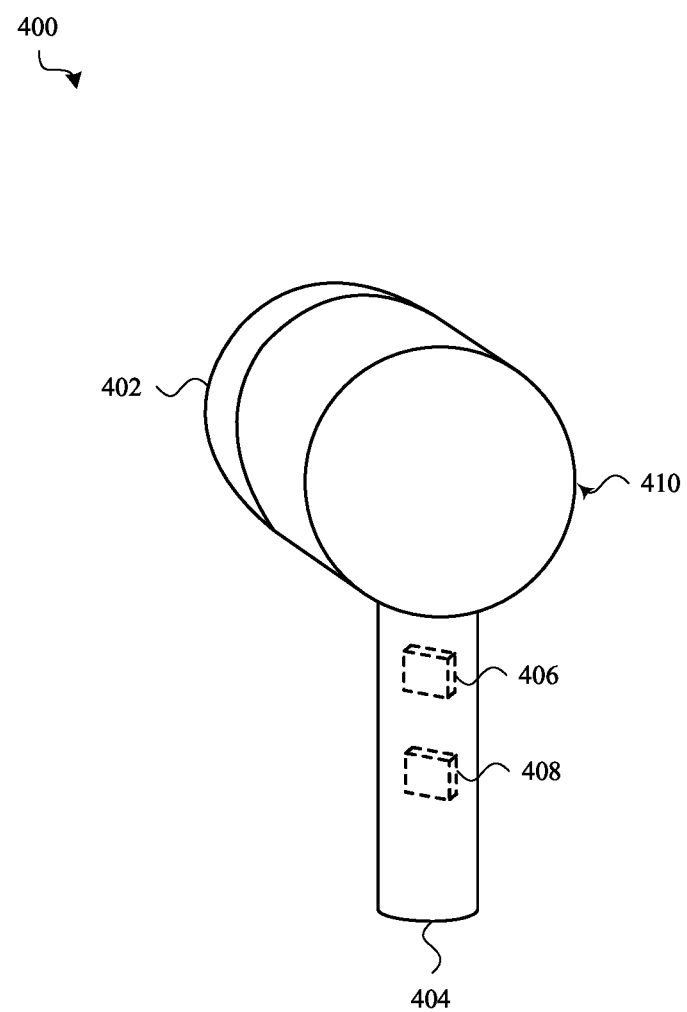

FIGS. 2-4 show various example electronic devices that include an SMI sensor. In particular, FIG. 2 shows an example of a device 200 (an electronic device). The device 200 may include a body 202 (e.g., a watch body) and a band 204. The body 202 may include an input or selection device, such as a crown 206 or a button 208 that are attached to a housing 210 of the body 202. A band 204 may also be attached to the housing 210, and may be used to attach the body 202 to a body part (e.g., an arm, wrist, leg, ankle, or waist) of a user. The body 202 may include a housing 210 that at least partially surrounds a display 212. In some embodiments, the housing 210 may include a sidewall 214, which sidewall 214 may support a front cover 216. The front cover 216 may be positioned over the display 212, and may provide a window through which the display 212 may be viewed. In some embodiments, the display 212 may be attached to (or abut) the sidewall 214 and/or the front cover 216. In alternative embodiments of the device 200, the display 212 may not be included and/or the housing 210 may have an alternative configuration.

The display 212 may include one or more light-emitting elements including, for example, light-emitting elements that define a light-emitting diode (LED) display, organic LED (OLED) display, liquid crystal display (LCD), electroluminescent (EL) display, or other type of display. In some embodiments, the display 212 may include, or be associated with, one or more touch and/or force sensors that are configured to detect a touch and/or a force applied to a surface of the front cover 216.

In some embodiments, the sidewall 214 of the housing 210 may be formed using one or more metals (e.g., aluminum or stainless steel), polymers (e.g., plastics), ceramics, or composites (e.g., carbon fiber). The front cover 216 may be formed, for example, using one or more of glass, a crystal (e.g., sapphire), or a transparent polymer (e.g., plastic) that enables a user to view the display 212 through the front cover 216. In some cases, a portion of the front cover 216 (e.g., a perimeter portion of the front cover 216) may be coated with an opaque ink to obscure components included within the housing 210. In some cases, all of the exterior components of the housing 210 may be formed from a transparent material, and components within the device 200 may or may not be obscured by an opaque ink or opaque structure within the housing 210.

The front cover 216 or a back cover (not shown) may be mounted to the sidewall 214 using fasteners, adhesives, seals, gaskets, or other components.

A display stack or device stack (hereafter referred to as a "stack") including the display 212 may be attached (or abutted) to an interior surface of the front cover 216 and extend into an interior volume of the device 200. In some cases, the stack may include a touch sensor (e.g., a grid of capacitive, resistive, strain-based, ultrasonic, or other type of touch sensing elements), or other layers of optical, mechanical, electrical, or other types of components. In some cases, the touch sensor (or part of a touch sensor system) may be configured to detect a touch applied to an outer surface of the front cover 216 (e.g., to a display surface of the device 200).

In some cases, a force sensor (or part of a force sensor system) may be positioned within the interior volume below and/or to the side of the display 212 (and in some cases within the device stack). The force sensor (or force sensor system) may be triggered in response to the touch sensor detecting one or more touches on the front cover 216 (or a location or locations of one or more touches on the front cover 216), and may determine an amount of force associated with each touch, or an amount of force associated with the collection of touches as a whole. The force sensor (or force sensor system) may alternatively trigger operation of the touch sensor (or touch sensor system), or may be used independently of the touch sensor (or touch sensor system).

The device 200 may include various sensors. In some embodiments, the device 200 may have a port 218 (or set of ports) on a side of the housing 210 (or elsewhere), and an ambient pressure sensor, ambient temperature sensor, internal/external differential pressure sensor, gas sensor, particulate matter concentration sensor, or air quality sensor may be positioned in or near the port(s) 218.

In some embodiments, the device 200 may include an SMI sensor 220. The SMI sensor 220 may be configured as described with reference to FIGS. 1A and/or 1B, and may be positioned to emit a beam of light toward or adjacent the crown 206. For example, the SMI sensor 220 may emit a beam of light toward a shaft of the crown 206. A processor 222 may receive an SMI signal from the SMI sensor 220 and determine a velocity or other parameters of the crown's movement. Alternatively, the crown 206 may not move, and the SMI sensor 220 may measure a velocity of a fingertip that is swiped on or near the crown 206.

In some embodiments, the processor 222 may be configured to change a state of the device 200 in response to an amplitude and direction of a measured velocity of the crown 206 or a fingertip (e.g., a measured angular velocity). For example, the processor 222 may change what is displayed on the display 212, adjust a volume of a local (internal to the device) or remote speaker, activate or deactivate a function or mode of the device 200, and so on.

In some embodiments, the SMI sensor 220 may emit a beam of light adjacent the crown, outward from the display 212, or out of the back of the device 200, and the processor may use an SMI signal generated by the SMI sensor 220 to determine a proximity of a fingertip, stylus, or wrist of a user to the device 200.

FIG. 3 shows another example of a device 300 (an electronic device) that includes an SMI sensor. The device's dimensions and form factor, including the ratio of the length of its long sides to the length of its short sides, suggest that the device 300 is a mobile phone (e.g., a smartphone). However, the device's dimensions and form factor are arbitrarily chosen, and the device 300 could alternatively be any portable electronic device including, for example a mobile phone, tablet computer, portable computer, portable music player, portable terminal, vehicle navigation system, robot navigation system, or other portable or mobile device. The device 300 could also be a device that is semi-permanently located (or installed) at a single location (e.g., a door lock, thermostat, refrigerator, or other appliance).

The device 300 may include a housing 302 that at least partially surrounds a display 304. The housing 302 may include or support a front cover 306 or a rear cover 308. The front cover 306 may be positioned over the display 304, and may provide a window through which the display 304 (including images displayed thereon) may be viewed by a user. In some embodiments, the display 304 may be attached to (or abut) the housing 302 and/or the front cover 306.

The display 304 may include one or more light-emitting elements or pixels, and in some cases may be an LED display, an OLED display, an LCD, an EL display, a laser projector, or another type of electronic display. In some embodiments, the display 304 may include, or be associated with, one or more touch and/or force sensors that are configured to detect a touch and/or a force applied to a surface of the front cover 306.

The various components of the housing 302 may be formed from the same or different materials. For example, a sidewall 318 of the housing 302 may be formed using one or more metals (e.g., stainless steel), polymers (e.g., plastics), ceramics, or composites (e.g., carbon fiber). In some cases, the sidewall 318 may be a multi-segment sidewall including a set of antennas. The antennas may form structural components of the sidewall 318. The antennas may be structurally coupled (to one another or to other components) and electrically isolated (from each other or from other components) by one or more non-conductive segments of the sidewall 318. The front cover 306 may be formed, for example, using one or more of glass, a crystal (e.g., sapphire), or a transparent polymer (e.g., plastic) that enables a user to view the display 304 through the front cover 306. In some cases, a portion of the front cover 306 (e.g., a perimeter portion of the front cover 306) may be coated with an opaque ink to obscure components included within the housing 302. The rear cover 308 may be formed using the same material(s) that are used to form the sidewall 318 or the front cover 306, or may be formed using a different material or materials. In some cases, the rear cover 308 may be part of a monolithic element that also forms the sidewall 318 (or in cases where the sidewall 318 is a multi-segment sidewall, those portions of the sidewall 318 that are non-conductive). In still other embodiments, all of the exterior components of the housing 302 may be formed from a transparent material, and components within the device 300 may or may not be obscured by an opaque ink or opaque structure within the housing 302.

The front cover 306 may be mounted to the sidewall 318 to cover an opening defined by the sidewall 318 (i.e., an opening into an interior volume in which various electronic components of the device 300, including the display 304, may be positioned). The front cover 306 may be mounted to the sidewall 318 using fasteners, adhesives, seals, gaskets, or other components.

A display stack or device stack (hereafter referred to as a "stack") including the display 304 (and in some cases the front cover 306) may be attached (or abutted) to an interior surface of the front cover 306 and extend into the interior volume of the device 300. In some cases, the stack may also include a touch sensor (e.g., a grid of capacitive, resistive, strain-based, ultrasonic, or other type of touch sensing elements), or other layers of optical, mechanical, electrical, or other types of components. In some cases, the touch sensor (or part of a touch sensor system) may be configured to detect a touch applied to an outer surface of the front cover 306 (e.g., to a display surface of the device 300).

In some cases, a force sensor (or part of a force sensor system) may be positioned within the interior volume below and/or to the side of the display 304 (and in some cases within the stack). The force sensor (or force sensor system) may be triggered in response to the touch sensor detecting one or more touches on the front cover 306 (or indicating a location or locations of one or more touches on the front cover 306), and may determine an amount of force associated with each touch, or an amount of force associated with the collection of touches as a whole.

The device 300 may include various other components. For example, the front of the device 300 may include one or more front-facing cameras 310 (including one or more image sensors), speakers 312, microphones, or other components 314 (e.g., audio, imaging, and/or sensing components) that are configured to transmit or receive signals to/from the device 300. In some cases, a front-facing camera 310, alone or in combination with other sensors, may be configured to operate as a bio-authentication or facial recognition sensor. Additionally or alternatively, the array of sensors 316 may be configured to operate as a front-facing camera 310, a bio-authentication sensor, or a facial recognition sensor.

The device 300 may also include buttons or other input devices positioned along the sidewall 318 and/or on a rear surface of the device 300. For example, a volume button or multipurpose button 320 may be positioned along the sidewall 318, and in some cases may extend through an aperture in the sidewall 318. The sidewall 318 may include one or more ports 322 that allow air, but not liquids, to flow into and out of the device 300. In some embodiments, one or more sensors may be positioned in or near the port(s) 322. For example, an ambient pressure sensor, ambient temperature sensor, internal/external differential pressure sensor, gas sensor, particulate matter concentration sensor, or air quality sensor may be positioned in or near a port 322.

In some embodiments, the device 300 may include an SMI sensor 316. The SMI sensor 316 may be configured as described with reference to FIGS. 1A and/or 1B, and may be positioned to emit a beam of light toward or adjacent the button 320. A processor 324 may receive an SMI signal from the SMI sensor 316 and determine a velocity or other parameters of the button's movement. Alternatively, the button 320 may not move, and the SMI sensor 316 may measure a velocity of a fingertip that is swiped on or near the button 320, or measure a velocity of a fingertip's approach toward the button 320 (e.g., to determine whether a user intends to make a button press gesture).

In some embodiments, the processor 324 may be configured to change a state of the device 300 in response to an amplitude and direction of a measured velocity of the button 320 or a fingertip. For example, the processor 324 may change what is displayed on the display 304 (e.g., scroll content displayed on the display in response to an amplitude and direction of the velocity of a fingertip swipe on the button 320), adjust a volume of a local (internal to the device) or remote speaker, activate or deactivate a function or mode of the device 300, and so on.

In some embodiments, the SMI sensor 316 may emit a beam of light outward from the display 304, or out of the back of the device 300, and the processor may use an SMI signal generated by the SMI sensor 316 to determine a proximity of a fingertip, hand, or other object to the device 300.

FIG. 4 shows an example of an earbud 400 (an electronic device) that an SMI sensor 408. The earbud 400 may include a housing 410 (i.e., an earbud housing). The housing 410 may hold a speaker 402 that can be inserted into a user's ear, an optional microphone 404, and circuitry 406 that can be used to acquire audio from the microphone 404, transmit audio to the speaker 402, and communicate audio between the speaker 402, the microphone 404, and one or more remote devices. The circuitry 406 may communicate with a remote device wirelessly (e.g., via a wireless communications interface, using a Wi-Fi, BLUETOOTH®, or cellular radio communications protocol, for example) or via one or more wires (e.g., via a wired communications interface, such as a Universal Serial Bus (USB) communications interface). In addition to communicating audio, the circuitry 406 may transmit or receive instructions, and so on.

The SMI sensor 408 may be used, for example, to determine a proximity of a user to the earbud 400 or speaker 402, or to receive input from a user. In some cases, the SMI sensor 408 may be used to identify a gesture of a user (e.g., a swipe gesture or a press gesture) made on a surface of the earbud 400 or in free space in proximity to the earbud 400. The SMI sensor 408 may include skin-facing and/or non-skin-facing sensors.

The circuitry 406 may include a processor and/or other components that are configured to determine or extract, at least partly in response to an SMI signal received directly or indirectly from the SMI sensor 408, information related to a proximity of a user, an input of a user (e.g., a velocity of a swipe), and so on. In some embodiments, the circuitry 406 may be configured to convey the determined or extracted parameters or statuses via an output device of the earbud 400. For example, the circuitry 406 may cause the indication(s) to be output via the speaker 402 or a haptic device, transmitted via a wireless communications interface or other communications interface, and so on. The circuitry 406 may also or alternatively maintain or alter one or more settings, functions, or aspects of the earbud 400, including, in some cases, what is output via the speaker 402 (e.g., a processor of the circuitry 406 may be configured to adjust a volume of the speaker 402 in proportion to an amplitude and a direction of the velocity of a swipe on the housing 410).

Figure 5A:
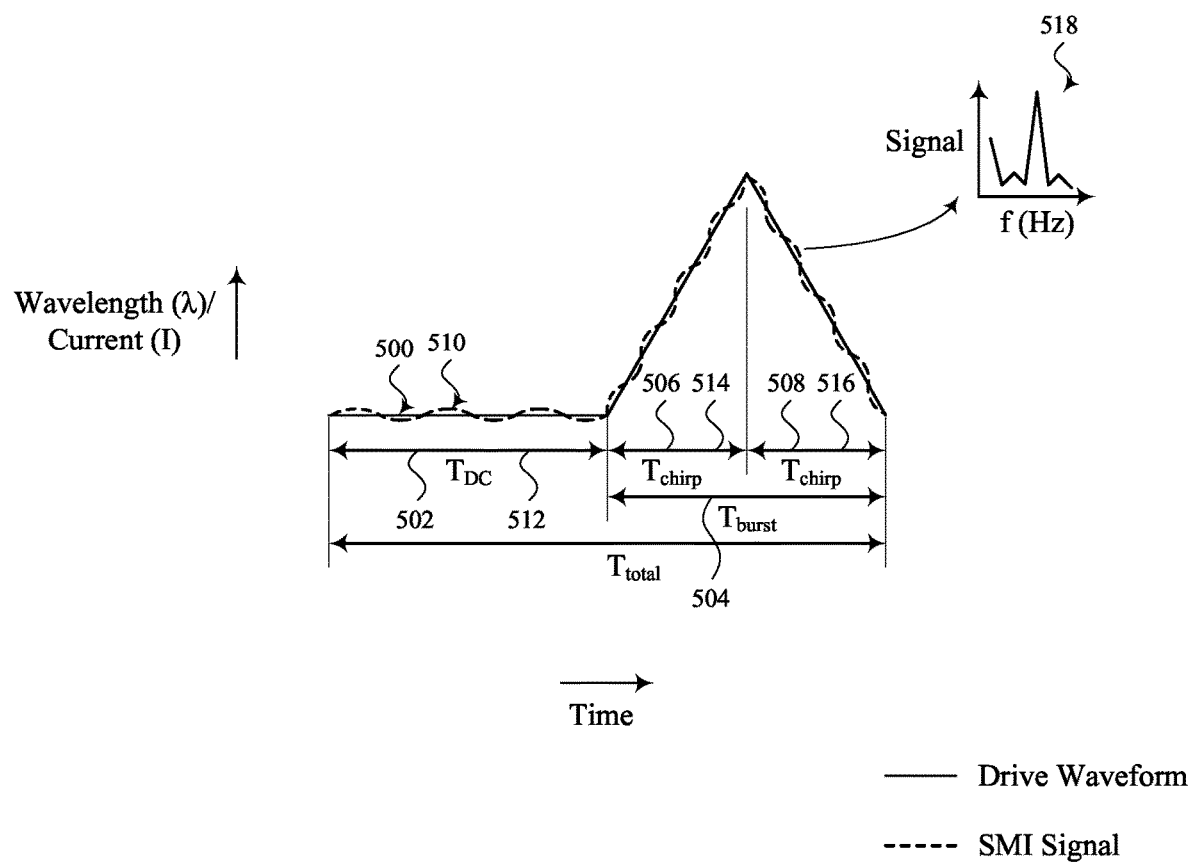
FIGS. 5A-5C show example waveforms that may be used to drive an SMI sensor.
Figure 5B:
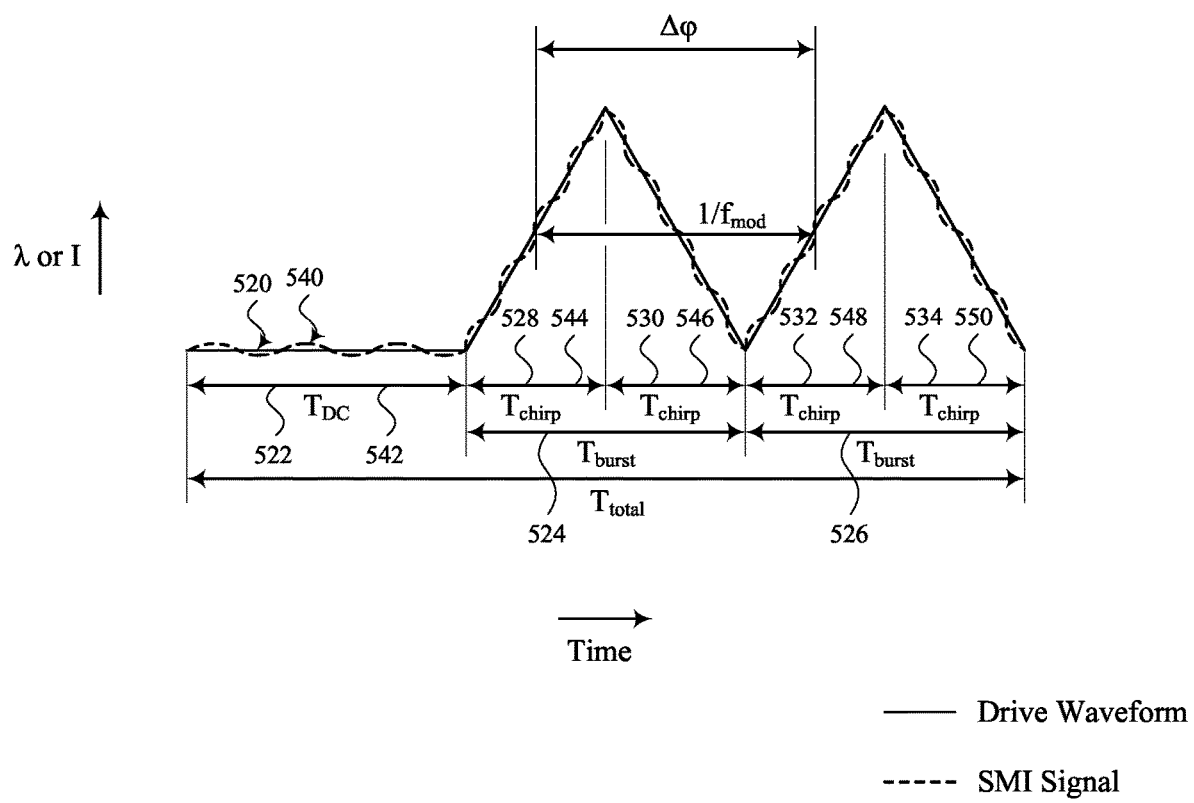
Figure 5C:
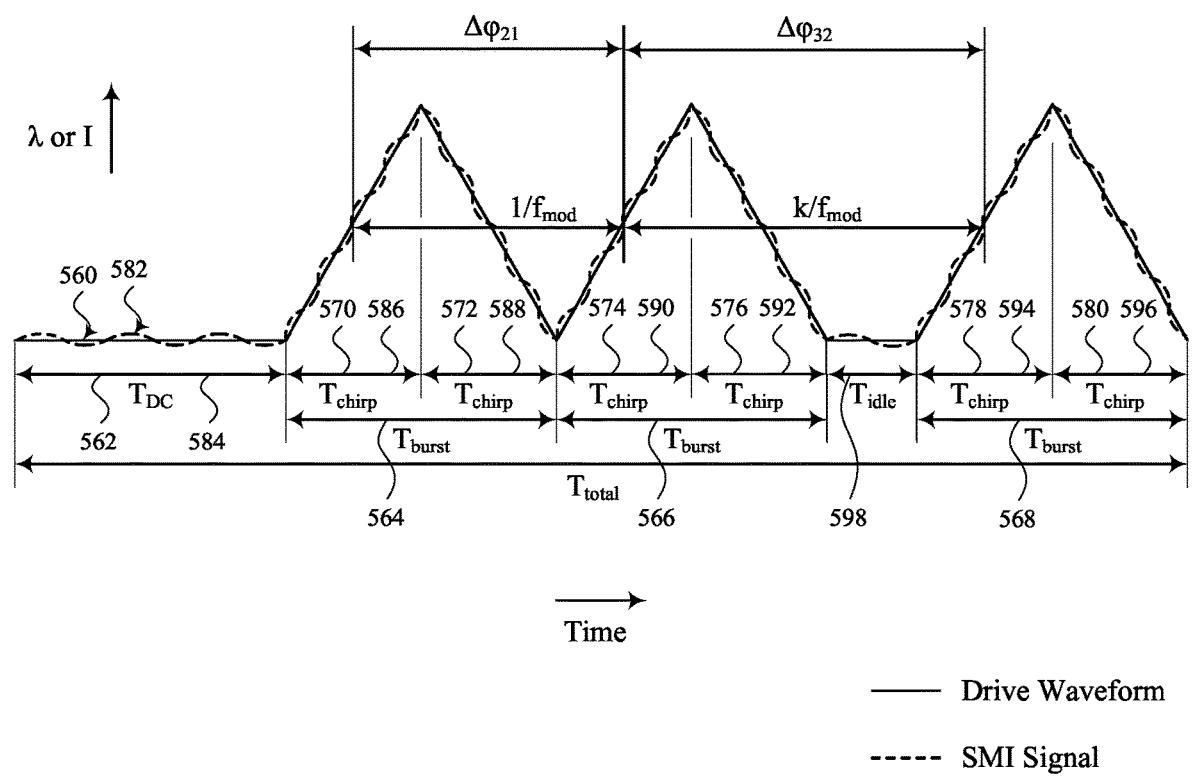

FIGS. 5A-5C show example waveforms that may be used to drive an SMI sensor. In some cases, the SMI sensor may be one of the SMI sensors described with reference to FIGS. 1A-4. Each waveform is graphed in relation to a horizontal axis that reflects a change in time (with points to the right being later in time than points to the left), and a vertical axis that reflects an increase in current or wavelength (with higher points being associated with greater current and a higher frequency wavelength than lower points).

FIG. 5A shows a first waveform 500 that may be used to drive an SMI sensor. The waveform 500 includes a direct current (DC) portion 502 spanning a period $T_{DC}$ and a burst portion 504 (e.g., a triangular burst, though the burst could alternatively have a different shape) spanning a period $T_{burst}$. Together, the DC portion 502 and burst portion 504 may span a period $T_{total}$. In some embodiments, the burst portion 504 may precede the DC portion 502. The burst portion 504 may include a pair of chirps 506, 508 (e.g., waveform segments that generally ramp up or down over time). A first chirp 506 may be defined by a rising edge of the burst portion 504, and a second chirp 508 may be defined by a falling edge of the burst portion 504. Each of the chirps 506, 508 may span a respective period $T_{chirp}$. The peak amplitude of the burst portion 504 is equal to the inverse (1/fmod) of a burst modulation frequency $f_{mod}$. Due to the presence of the chirps 506, 508, the waveform 500 may be referred to herein as a chirped waveform. For purposes of this description, not every portion of a chirped waveform needs to include a chirp. Some portions of a chirped waveform may define a DC portion or other portions of the waveform.

Superimposed on the waveform 500 is an SMI signal 510. The SMI signal 510 may have different portions 512, 514, 516, which different portions 512, 514, 516 contain SMI responses to driving an SMI sensor with the different portions 502, 506, 508 of the waveform 500. A first portion 512 of the SMI signal 510 may have a frequency $f_{DC}$; a second portion 514 of the SMI signal 510 may have a frequency $f_{RISE}$; and a third portion 516 of the SMI signal 510 may have a frequency $f_{FALL}$. The different portions 512, 514, 516 of the SMI signal 510 may be converted, by a processor or other circuitry, to frequency domain responses. An example graph of the frequency domain response of the portion 516 of the SMI signal 510 is shown in a graph 518 of frequency (in Hertz (Hz)) versus signal strength (or amplitude).

The frequency $f_{DC}$ is related to a wavelength (λ) and a velocity (v) of an object off which a beam of light emitted by the SMI sensor reflects. In particular, $$f_{DC} = \frac{2}{\lambda} \cdot v$$

Thus, a frequency-based velocity of the object can be determined as:

$$v_{f_{DC}} = \frac{\lambda}{2} \cdot f_{DC}$$

The frequency $f_{RISE}$ (or $f_{FALL}$) is also related to the wavelength (λ) and the velocity (v), as well as a distance (d) to the object. In particular, $$f_{RISE} = \frac{4\Delta\lambda \cdot f_{mod}}{\lambda^2} \cdot d \pm \frac{2}{\lambda} \cdot v$$

or a similar formula may be used to determine $f_{FALL}$.

A frequency-based velocity of the object, $v_{f_{diff}}$, can thus be determined using the portions 514, 516 of the SMI signal 510, containing a response to the chirps 506 and 508, as:

$$v_{f_{diff}} = \frac{\lambda}{2} f_{diff} = \frac{\lambda}{2} \frac{f_{RISE} - f_{FALL}}{2}$$

Although the frequency-based velocity of $v_{f_{diff}}$ may be more accurate than the frequency-based velocity $v_{DC}$, a phase-based velocity estimation may be more accurate than both. However, to determine a phase-based velocity of an object, a phase rollover domain containing the correct phase-based velocity estimate must be determined. If the incorrect phase rollover domain is identified, the phase-based velocity estimate may be no more accurate, or even less accurate, than a frequency-based velocity estimate.

FIG. 5B shows a second waveform 520 that may be used to drive an SMI sensor. The waveform 520 includes an optional DC portion 522 spanning a period $T_{DC}$ and a pair of burst portions 524, 526 (e.g., a pair of triangular bursts, though the bursts could alternatively have other shapes), with each burst portion 524, 526 spanning a respective period $T_{burst}$. Together, the DC portion 522 and burst portions 524, 526 may span a period $T_{total}$. In some embodiments, one or both of the burst portions 524, 526 may precede the DC portion 522, or the burst portions 524, 526 may be separated by an idle period. Each burst portion 524, 526 may include a pair of chirps 528, 530 or 532, 534. A first chirp 528, 532 of each pair may be defined by a rising edge of a respective burst portion 524, 526, and a second chirp 530, 534 of each pair may be defined by a falling edge of a respective burst portion 524, 526. Each of the chirps 528, 530, 532, 534 may span a respective period $T_{chirp}$. The duration of each burst portion 524, 526 is equal to the inverse ($1/f_{mod}$) of a burst modulation frequency $f_{mod}$.

Superimposed on the waveform 520 is an SMI signal 540. The SMI signal 540 may have different portions 542, 544, 546, 548, 550, which different portions 542, 544, 546, 548, 550 contain SMI responses to driving an SMI sensor with the different portions 522, 528, 530, 532, 534 of the waveform 520. A first portion 542 of the SMI signal 540 may have a frequency $f_{DC}$; second and fourth portions 544, 548 of the SMI signal 540 may have a frequency $f_{RISE}$; and third and fifth portions 546, 550 of the SMI signal 540 may have a frequency $f_{FALL}$. The different portions 542, 544, 546, 548, 550 of the SMI signal 540 may be converted, by a processor or other circuitry, to frequency domain responses, as described with reference to FIG. 5A.

A phase ($\emptyset_{RISE}$ or $\emptyset_{FALL}$) for each portion 544, 546, 548, 550 of the SMI signal may be determined using the formula:

$$\emptyset_{RISE} = 2\pi \int_0^T f_{RISE} \cdot dt$$

or using a similar formula for $\emptyset_{FALL}$.

A change in phase between portions of the SMI signal corresponding to two similar chirps (e.g., a $\Delta\emptyset_{RISE}$ for the portions 544, 548 corresponding to a pair of rising edge chirps 528, 532 or, alternatively, a $\Delta\emptyset_{FALL}$ for the portions 546, 550 corresponding to a pair of falling edge chirps 530, 534) may be determined using the following formula:

$$\Delta\emptyset_{RISE} = \pm 2\pi \cdot \frac{2v}{\lambda} \cdot T_{burst}$$

or using a similar formula for $\Delta\emptyset_{FALL}$.

A phase-based velocity of an object off which a beam of light emitted by the SMI sensor reflects (e.g., $v_{\Delta\emptyset_{RISE}}$ or $v_{\Delta\emptyset_{FALL}}$) can thus be determined as:

$$v_{\Delta\emptyset_{RISE}} = \frac{\lambda \cdot f_{mod}}{2} \left( \frac{\Delta\emptyset_{RISE}}{2\pi} + m \right)$$

where m is a modulo $2\pi$ phase rollover domain. A similar formula can be used to determine the velocity $v_{\Delta\emptyset_{RISE}}$. In some embodiments, $v_{\Delta\emptyset_{RISE}}$ and $v_{\Delta\emptyset_{FALL}}$ can be combined (e.g., averaged) to determine a velocity $v_{\Delta\emptyset}$.

A phase-based velocity can be advantageous in that it is not limited by a Fast Fourier Transform (FFT) length and is less affected by non-linearity bias (e.g., non-linear aspects from similar chirps cancel out). However, estimating m can be difficult.

A true or disambiguated velocity (v) of the object can be expressed as:

$$v = v_{\Delta\emptyset} + mv_{2\pi}$$

with $v_{\Delta\emptyset}$ being the velocity "remainder" in the first phase rollover domain ($-\pi, \pi$) and $v_{2\pi}$ being the phase rollover domain size. These terms can be expressed as:

$$v_{\Delta\emptyset} = \frac{\lambda \cdot f_{burst}}{4\pi} \cdot (\mathrm{mod}(\Delta\emptyset + \pi, 2\pi) - \pi)$$

$$v_{2\pi} = \frac{\lambda}{2} f_{burst}$$

where $f_{burst} = f_{mod}$ and the FFT bin size is $f_{bin} = \Delta f_{mod}$.

FIG. 5C shows a third waveform 560 that may be used to drive an SMI sensor. The waveform 560 includes an optional DC portion 562 spanning a period $T_{DC}$ and three burst portions 564, 566, 568 (e.g., three triangular bursts, though the bursts could alternatively have other shapes), with each burst portion 564, 566, 568 spanning a respective period $T_{burst}$. The first burst 564 and the second burst 566 are separated by a first time interval, equal to $1/f_{mod}$. The second burst 566 and the third burst 568 are separated by a second time interval, different from the first time interval, equal to $k/f_{mod}$, where k is an integer or non-integer constant. An idle period 598, such as a DC idle period, may bridge a time period, $T_{idle}$, between the end of the second burst 566 and the start of the third burst 568. Together, the DC portion 562, burst portions 564, 566, 568, and idle period 598 may span a period $T_{total}$. In some embodiments, one or more of the burst portions 564, 566, 568 may precede the DC portion 562, or the first and second burst portions 564, 566 may be separated by an idle period (and possibly with a removal of the idle period 598).

Each burst portion 564, 566, 568 may include a pair of chirps 570, 572, or 574, 576, or 578, 580. A first chirp 570, 574, 578 of each pair may be defined by a rising edge of a respective burst portion 564, 566, 568, and a second chirp 572, 576, 580 of each pair may be defined by a falling edge of a respective burst portion 564, 566, 568. Each of the chirps 570, 572, 574, 576, 578, 580 may span a respective period $T_{chirp}$. The duration of each burst portion 564, 566, 568 is equal to the inverse ($1/f_{mod}$) of a burst modulation frequency $f_{mod}$.

Superimposed on the waveform 560 is an SMI signal 582. The SMI signal 582 may have different portions 584, 586, 588, 590, 592, 594, 596, which different portions 584, 586, 588, 590, 592, 594, 596 contain SMI responses to driving an SMI sensor with the different portions 562, 570, 572, 574, 576, 578, 580 of the waveform 560. A first portion 546 of the SMI signal 582 may have a frequency $f_{DC}$; second, fourth, and sixth portions 570, 574, 578 of the SMI signal 582 may have a frequency $f_{RISE}$; and third, fifth, and seventh portions 572, 576, 580 of the SMI signal 582 may have a frequency $f_{FALL}$. The different portions 562, 570, 572, 574, 576, 578, 580 of the SMI signal 582 may be converted, by a processor or other circuitry, to frequency domain responses, as described with reference to FIG. 5A.

A phase ($\emptyset_{RISE}$ or $\emptyset_{FALL}$) for each portion 584, 586, 588, 590, 592, 594, 596 of the SMI signal 582 may be determined as described with reference to FIG. 5B. Various changes in phase, between portions of the SMI signal 582 corresponding to two similar chirps (e.g., rising edge chirps or falling edge chirps) may also be determined as described with reference to FIG. 5B. However, in contrast to the SMI signal described with reference to FIG. 5B, the SMI signal 582 has multiple rising edge phase differences and multiple falling edge phase differences. By way of example, two rising edge phase differences are identified as $\Delta\emptyset_{21}$, between the portions 586 and 590, and 432, between the portions 590 and 594. For these phase differences, a true or disambiguated velocity (v) of an object off which a beam of light emitted by the SMI sensor reflects can be expressed as:

$$v = v_{\Delta\emptyset,ij} + m v_{2\pi,ij}$$

with $v_{\Delta\emptyset,ij}$ being the velocity "remainder" in the first phase rollover domain $(-\pi,\pi)$ and $v_{2\pi,ij}$ being the phase rollover domain size. These terms can be expressed as:

$$v_{\Delta\emptyset,ij} = \frac{\lambda \cdot f_{burst,ij}}{4\pi} \cdot (\mathrm{mod}(\Delta\emptyset_{ij} + \pi, 2\pi) - \pi)$$

$$v_{2\pi,ij} = \frac{\lambda}{2} f_{burst,ij}$$

where $f_{burst,21} = f_{mod}$, $f_{burst,32} = f_{mod}/k$, and the FFT bin size is $f_{bin} = \lambda f_{mod}$. The above equations yield different combs of possible velocities, with each possible velocity existing in a different phase rollover domain. The different combs are described in more detail with reference to FIGS. 6A and 6B. The above equations can also be used to generate combs of possible velocities based on portions 588, 592, 596 of the SMI signal 582 corresponding to falling edge chirps and their respective phase differences.

Figure 6A:
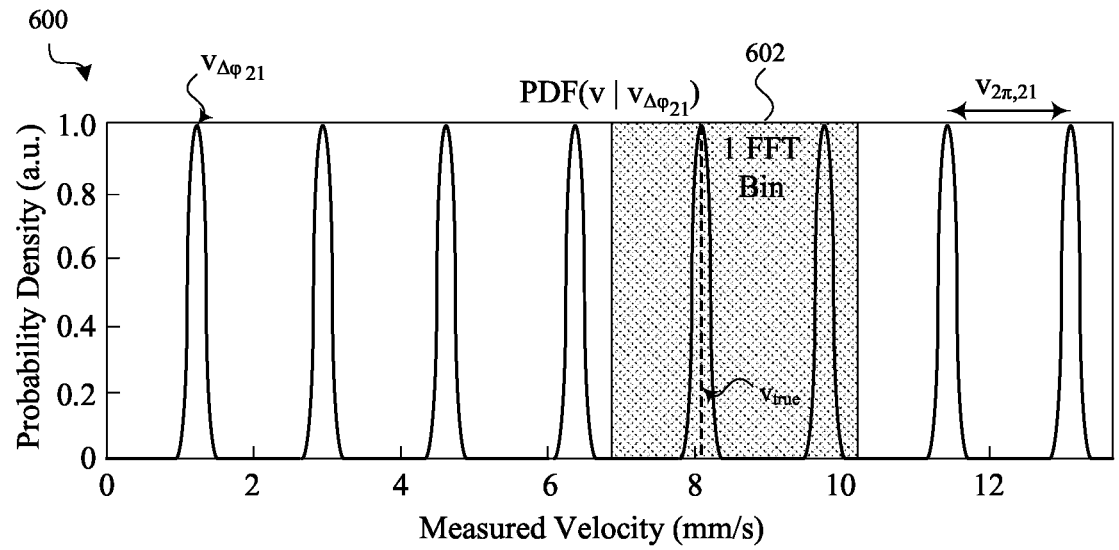
FIG. 6A shows an example first comb of possible velocities.

FIG. 6A shows an example first comb 600 of possible velocities (or probability density function (PDF)) for an object off which a beam of light emitted by an SMI sensor reflects. The comb 600 may be generated in response to a processor analyzing an output of an SMI sensor, which output of the SMI sensor is generated in response to a first pair of chirps (e.g., two chirps defined by respective rising edges of a chirped waveform, or two chirps defined by respective falling edges of a chirped waveform). The analysis may include measuring a phase difference (e.g., $\Delta\emptyset_{21}$) between the chirps. The first pair of chirps may be separated by a first time interval and, by way of example, the chirps may be the chirps 570 and 574 in FIG. 5C.

The comb 600 includes a velocity "remainder" ($v_{\Delta\emptyset,21}$) in a first phase rollover domain, and additional possible velocities in different phase rollover domains. The size (or width) of each phase rollover domain is equal to $v_{2\pi,21}$. As shown, the comb 600 contains the true velocity ($v_{true}$) of the object. However, a method is needed to identify the true velocity from within the comb 600.

In some cases, a frequency-based velocity may be derived from the output of the SMI sensor, as described with reference to FIG. 5A or 5B. Although possibly inaccurate, such a frequency-based velocity may sometimes be used to identify an FFT bin 602 containing the true velocity. However, as shown in FIG. 6A, identifying the FFT bin 602 containing the true velocity still leaves some ambiguity as to what the true velocity is, since the FFT bin 602 contains two possible velocities. Further disambiguation is needed.

Figure 6B:
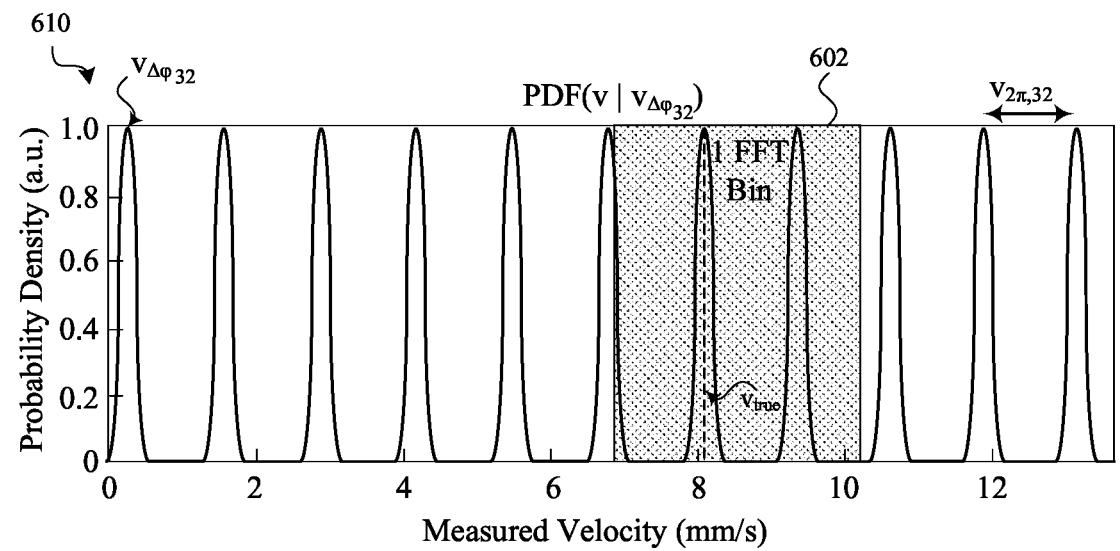
FIG. 6B shows an example second comb of possible velocities.

FIG. 6B shows an example second comb 610 of possible velocities (or a different PDF) for the object off which the beam of light emitted by the SMI sensor reflects. The comb 610 may be generated in response to the processor analyzing an output of an SMI sensor, which output of the SMI sensor is generated in response to a second pair of chirps (e.g., two chirps defined by respective rising edges of a chirped waveform, or two chirps defined by respective falling edges of a chirped waveform). The analysis may include measuring a phase difference (e.g., $\Delta\emptyset_{32}$) between the chirps. The second pair of chirps may be separated by a second time interval that is different from the first time interval and, by way of example, the chirps may be the chirps 574 and 578 in FIG. 5C.

The comb 610 includes a velocity "remainder" ($v_{\Delta\emptyset,32}$) in a first phase rollover domain, and additional possible velocities in different phase rollover domains. The size (or width) of each phase rollover domain is equal to $v_{2\pi,32}$. As shown, the comb 610 contains the true velocity ($v_{true}$) of the object. However, a method is again needed to identify the true velocity from within the comb 610.

Figure 6C:
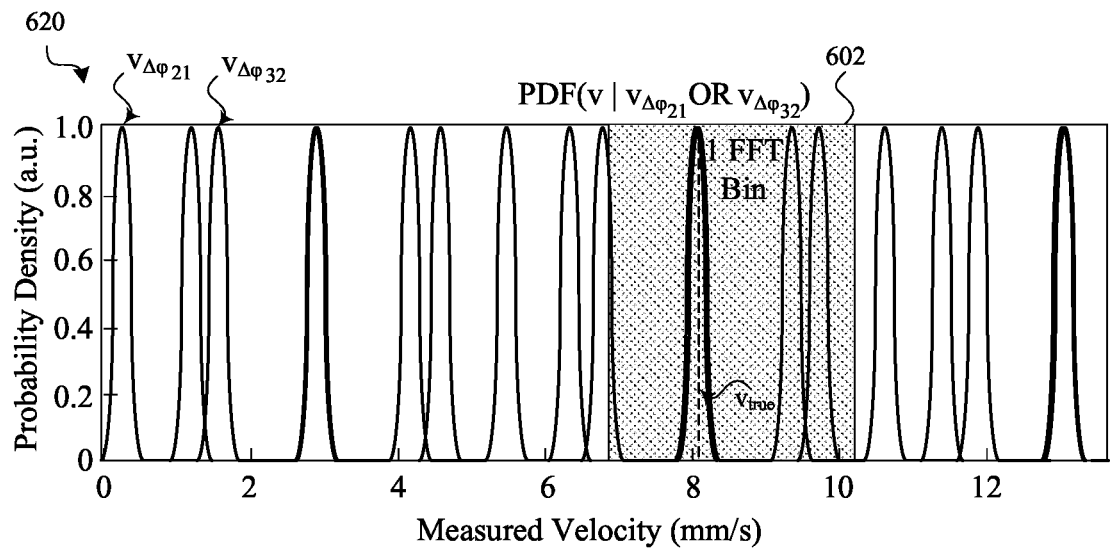
FIG. 6C shows an example alignment of the first and second combs described with reference to FIGS. 6A and 6B.

FIG. 6C shows an overlay 620, or alignment, of the first and second combs 600, 610 described with reference to FIGS. 6A and 6B. As shown, some of the possible velocities in the first comb 600 may align with possible velocities in the second comb 610, while others may not. FIG. 6C shows three alignments of possible velocities in the first and second combs 600, 610. In some cases, possible velocities may be considered aligned if they are exactly aligned. In other cases, a first possible velocity in the first comb 600 and a second possible velocity in the second comb 610 may be attributable to the same possible velocity when the first possible velocity and the second possible velocity are within a velocity margin of error.

Figure 6D:
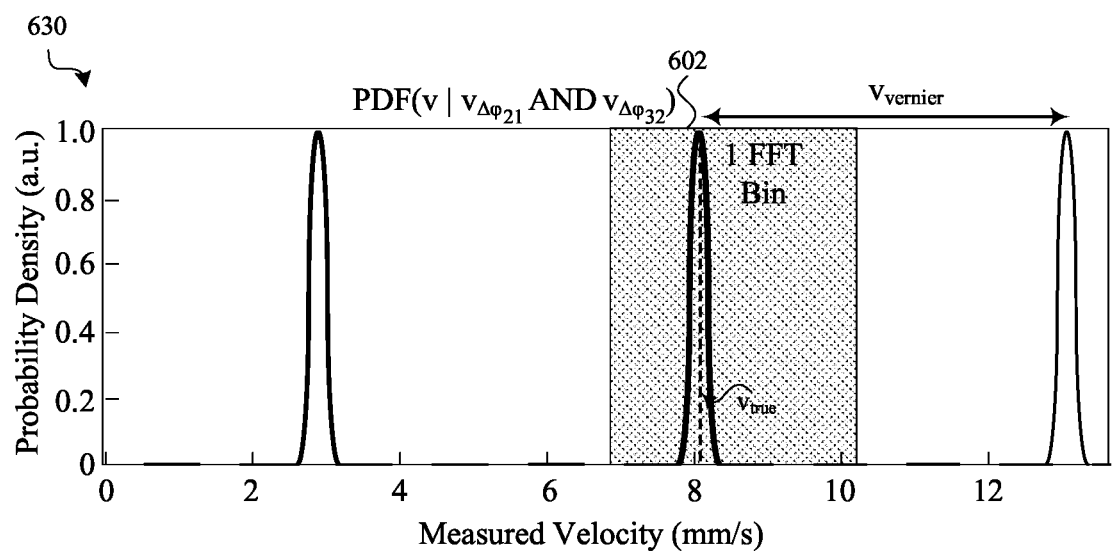
FIG. 6D shows an example third comb of possible velocities.

FIG. 6D shows an example third comb 630 of possible velocities for the object off which the beam of light emitted by the SMI sensor reflects. The comb 630 includes the possible velocities appearing in both the first comb 600 and the second comb 610. In the third comb 630, the possible velocities are less dense and separated by a phase rollover domain size of $v_{vernier}$. Because the phase rollover domain size $v_{vernier}$ is larger than the phase rollover domain size $v_{\Delta\varnothing,21}$ or $v_{\Delta\varnothing,32}$, and larger than the FFT bin 602, using the frequency-based velocity to identify the FFT bin 602 containing the true velocity of the object (true) also enables the processor to identify the true velocity of the object (i.e., because the FFT bin 602 only contains one possible velocity).

In some cases, a chirped waveform may have more than three chirps spaced at more than two different time intervals. In these cases, more than two combs of possible velocities may be aligned to further narrow the number of possible velocities in a combined comb, such as the comb described with reference to FIG. 6D.

Figure 7:
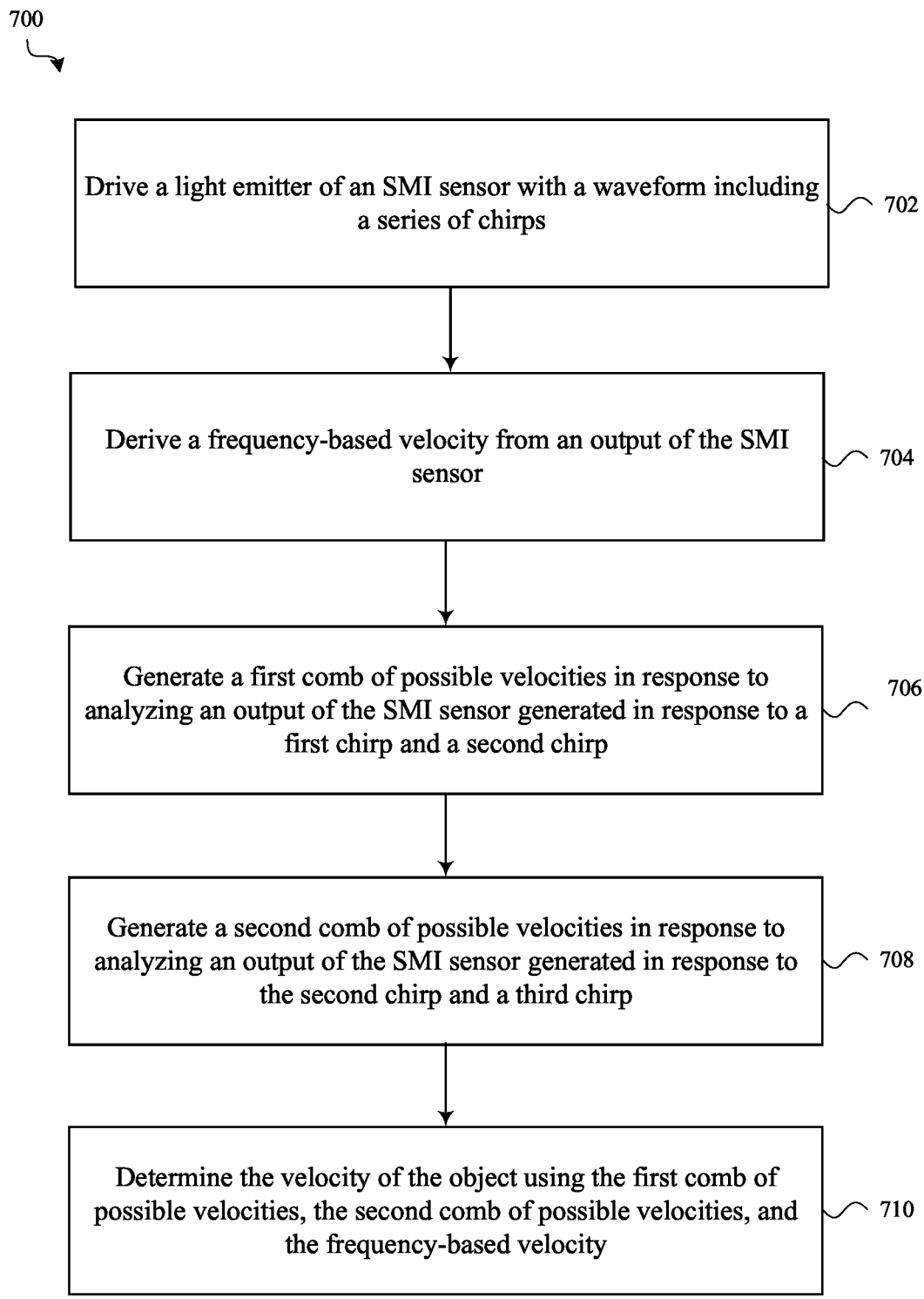
FIG. 7 shows an example method of estimating a velocity of an object using an SMI sensor.

FIG. 7 shows an example method 700 of estimating a velocity of an object using an SMI sensor. The SMI sensor may include a light emitter, and in some cases may be the SMI sensor described or discussed with reference to any of FIGS. 1A-6D. The method 700 may be performed by a processor of any of the devices described with reference to FIGS. 2-4, or by the processor described with reference to FIG. 9.

At block 702, the method 700 may include driving the light emitter with a waveform including a series of chirps. The series of chirps may include a first chirp and a second chirp separated by a first time interval, and a third chirp separated from the second chirp by a second time interval. The second time interval may be different from the first time interval. In some embodiments, some of the remaining operations of the method 700 may be performed or initiated while portions of the waveform are still being applied to the light emitter.

At block 704, the method 700 may include deriving a frequency-based velocity from an output of the SMI sensor. In some cases, the frequency-based velocity may be derived as described with reference to FIG. 5A or 5B. In some embodiments, a processor may derive the frequency-based velocity of the object from a portion of an SMI signal that includes a response to a DC portion of a waveform (e.g., a DC portion of a chirped waveform). In some cases, derivation of the frequency-based velocity estimate may employ frequency domain interpolation techniques, to improve its resolution and, in some cases, enhance the accuracy of a final velocity estimation.

At block 706, the method 700 may include generating a first comb of possible velocities in response to analyzing an output of the SMI sensor generated in response to the first chirp and the second chirp (e.g., analyzing portions of an SMI signal containing a response to the first and second chirps). In some embodiments, analyzing the output of the SMI sensor may include measuring a phase difference between the first and second chirps. In some cases, the first comb may be the comb described with reference to FIG. 6A.

At block 708, the method 700 may include generating a second comb of possible velocities in response to analyzing an output of the SMI sensor generated in response to the second chirp and the third chirp (e.g., analyzing portions of an SMI signal containing a response to the second and third chirps). In some embodiments, analyzing the output of the SMI sensor may include measuring a phase difference between the second and third chirps. In some cases, the second comb may be the comb described with reference to FIG. 6B.

In some embodiments, the first and second chirps (or first pair of chirps) and second and third chirps (or second pair of chirps) may all be defined by one of rising edges of a chirped waveform or, alternatively, falling edges of a chirped waveform. In some cases, all of the chirps may be defined by rising or falling edges of a set of triangular bursts. In some cases, the first, second, and third chirps may be defined by respective corresponding portions (e.g., rising or falling portions) of first, second, and third triangular bursts (or bursts having other shapes); the first time interval may be defined between corresponding portions of the first triangular burst and the second triangular burst; and the second time interval may be defined between corresponding portions of the second triangular burst and the third triangular burst.

At block 710, the method 700 may include determining the velocity of the object using the first comb of possible velocities, the second comb of possible velocities, and the frequency-based velocity.

In some embodiments, determining the velocity of the object, at 710, may include identifying a third comb of possible velocities consisting of possible velocities appearing in both the first comb of possible velocities and the second comb of possible velocities, as described with reference to FIGS. 6C and 6D; and identifying a possible velocity, within the third comb of possible velocities, within a predetermined range of the frequency-based velocity determined at 704. In some cases, a first possible velocity in the first comb and a second possible velocity in the second comb may be attributable to a possible velocity appearing in both the first comb and the second comb when the first possible velocity and the second possible velocity are within a velocity margin of error.

Figure 8:
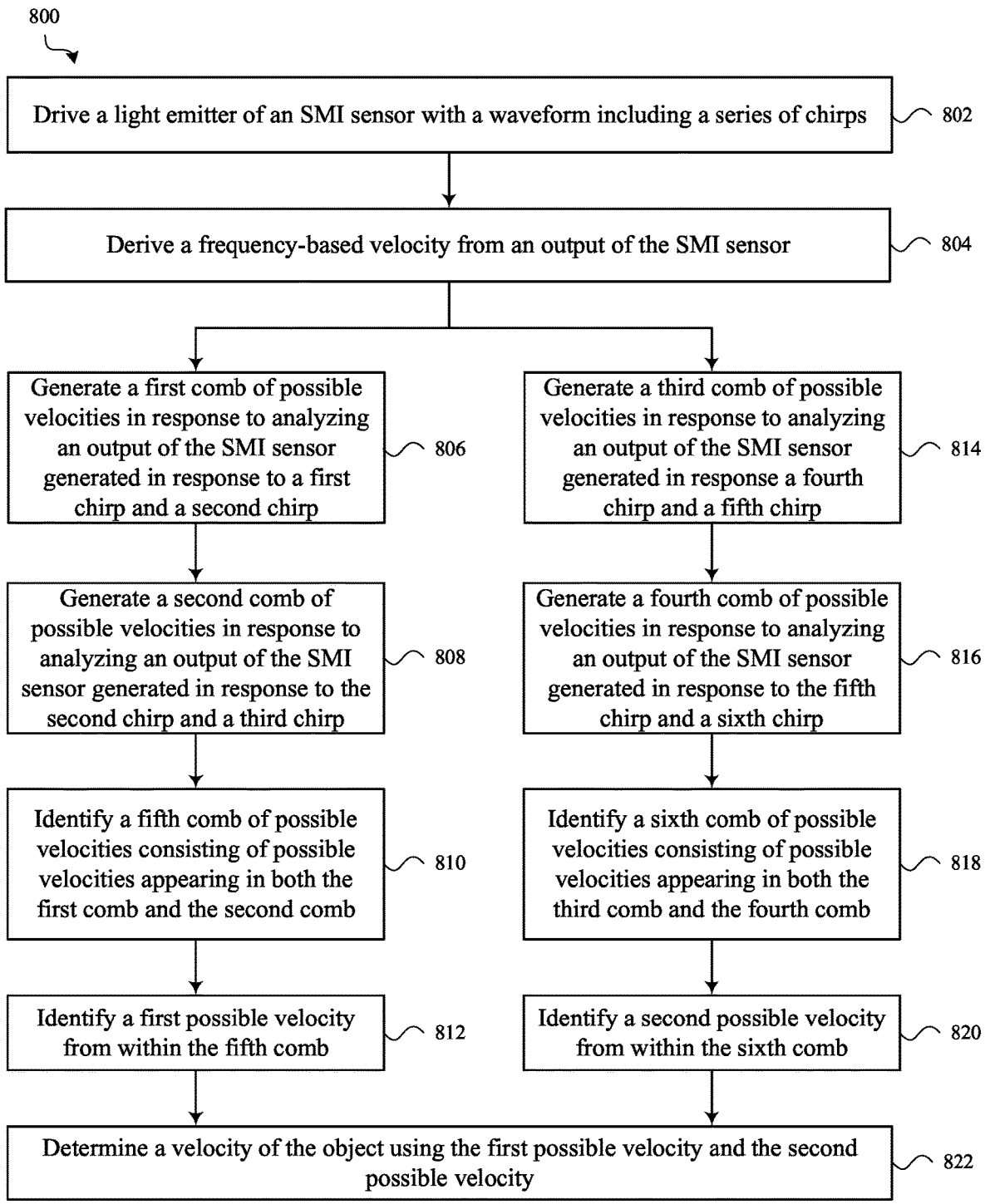
FIG. 8 shows a variation of the method described with reference to FIG. 7.

FIG. 8 shows a variation 800 of the method described with reference to FIG. 7. The method 800 may be performed by a processor of any of the devices described with reference to FIGS. 2-4, or by the processor described with reference to FIG. 9.

Blocks 802, 804, 806, and 808 are similar to blocks 702, 704, 706, and 708 of method 700 and are not described further.

Blocks 810 and 812 are examples of some of the operations that may be performed at block 710 in FIG. 7. At block 810, the method 800 may include identifying a fifth comb of possible velocities. The fifth comb may consist of possible velocities appearing in both the first comb and the second comb, as described with reference to FIGS. 6C and 6D. At block 812, the method 800 may include identifying a first possible velocity, within the fifth comb, that is within a predetermined range of the frequency-based velocity derived at block 804.

Blocks 814, 816, 818, and 820 are similar to blocks 806, 808, 810, and 812, but may be performed for a different set of chirps. For example, the operations at blocks 806, 808, 810, and 812 may be performed for a set of chirps (e.g., first, second, and third chirps, or first and second pairs of chirps)

defined by rising edges of a set of bursts in a chirped waveform, and the operations at blocks 814, 816, 818, and 820 may be performed for a set of chirps (e.g., fourth, fifth, and sixth chirps, or third and fourth pairs of chirps) defined by falling edges of the set of bursts. At block 814, a third comb of possible velocities may be generated. At block 816, a fourth comb of possible velocities may be generated. At block 818, a sixth comb of possible velocities may be generated. At block 820, a second possible velocity may be identified.

At block 822, the method 800 may include determining the velocity of the object using the first possible velocity and the second possible velocity. In some cases the first and second possible velocities may be averaged or otherwise combined to determine the velocity of the object. In some cases, one of the first or second possible velocities may be discarded, and the remaining possible velocity may be selected as the velocity of the object.

Although FIGS. 7 and 8 show example methods of estimating a velocity of an object using an SMI sensor, the methods may be varied or altered in various ways, in accord with the description provided herein. In some cases (including those described above), a single velocity solution (i.e., a velocity of an object) may be derived from N combs of possible velocities generated for a series of N+1 chirps having different time delays between them.

Figure 9:
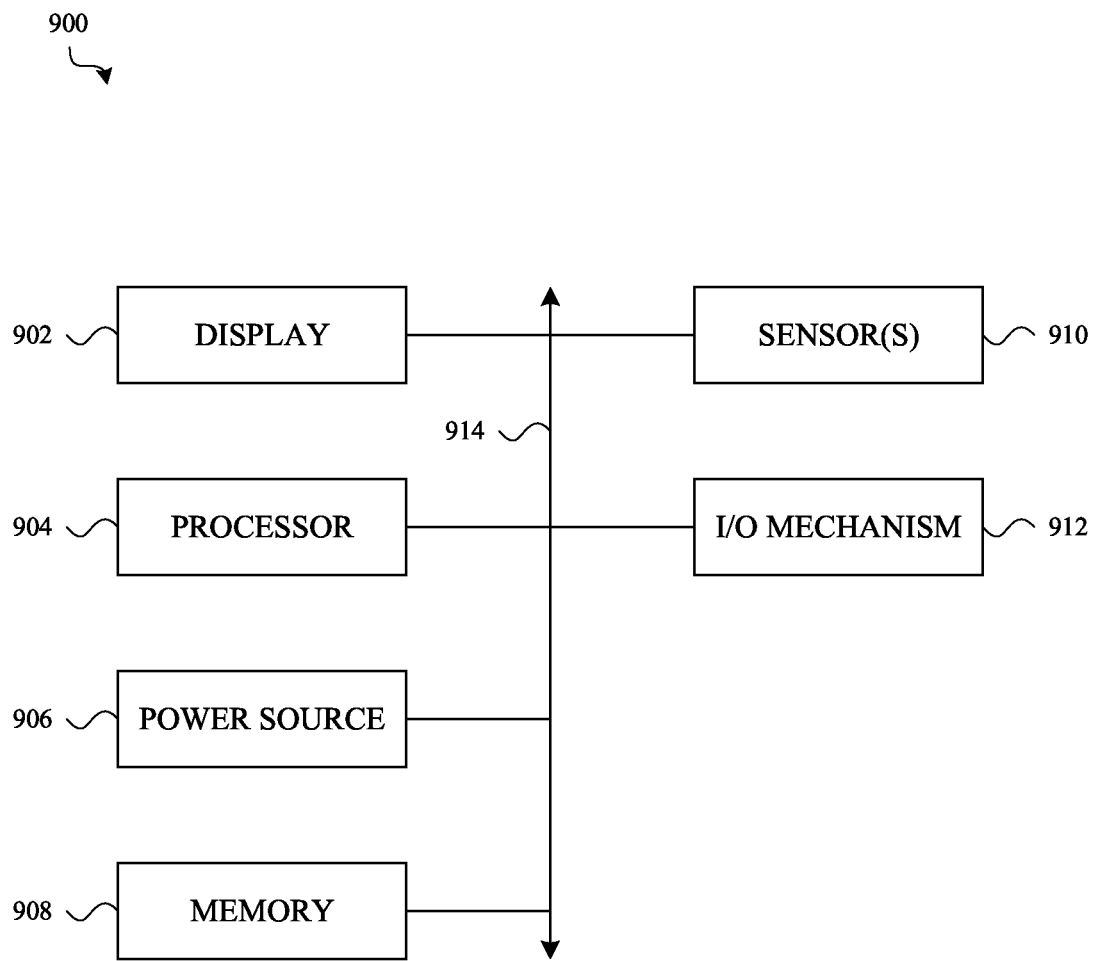
FIG. 9 shows a sample electrical block diagram of an electronic device.

FIG. 9 shows a sample electrical block diagram of an electronic device 900, which electronic device may in some cases be the device described with reference to one of FIGS. 2-4. The electronic device 900 may include an optional electronic display 902 (e.g., a light-emitting display), a processor 904, a power source 906, a memory 908 or storage device, a sensor system 910, or an input/output (I/O) mechanism 912 (e.g., an input/output device, input/output port, or haptic input/output interface). The processor 904 may control some or all of the operations of the electronic device 900. The processor 904 may communicate, either directly or indirectly, with some or all of the other components of the electronic device 900. For example, a system bus or other communication mechanism 914 can provide communication between the electronic display 902, the processor 904, the power source 906, the memory 908, the sensor system 910, and the I/O mechanism 912.

The processor 904 may be implemented as any electronic device capable of processing, receiving, or transmitting data or instructions, whether such data or instructions is in the form of software or firmware or otherwise encoded. For example, the processor 904 may include a microprocessor, a central processing unit (CPU), an application-specific integrated circuit (ASIC), a digital signal processor (DSP), a controller, or a combination of such devices. As described herein, the term "processor" is meant to encompass a single processor or processing unit, multiple processors, multiple processing units, or other suitably configured computing element or elements. In some cases, the processor 904 may perform the method described with reference to FIG. 7 or 8.

It should be noted that the components of the electronic device 900 can be controlled by multiple processors. For example, select components of the electronic device 900 (e.g., the sensor system 910) may be controlled by a first processor and other components of the electronic device 900 (e.g., the electronic display 902) may be controlled by a second processor, where the first and second processors may or may not be in communication with each other.

The power source 906 can be implemented with any device capable of providing energy to the electronic device 900. For example, the power source 906 may include one or more batteries or rechargeable batteries, or one or more contacts or housings for contacting or supporting the battery (ies). Additionally or alternatively, the power source 906 may include a power connector or power cord that connects the electronic device 900 to another power source, such as a wall outlet.

The memory 908 may store electronic data that can be used by the electronic device 900. For example, the memory 908 may store electrical data or content such as, for example, audio and video files, documents and applications, device settings and user preferences, timing signals, control signals, and data structures (e.g., instructions) or databases. The memory 908 may include any type of memory. By way of example only, the memory 908 may include random access memory, read-only memory, Flash memory, removable memory, other types of storage elements, or combinations of such memory types.

The electronic device 900 may also include a sensor system 910, including sensors positioned almost anywhere on the electronic device 900. In some cases, the sensor system 910 may include one or more SMI sensors, positioned and/or configured as described with reference to any of FIGS. 1A-8. The sensor system 910 may be configured to sense one or more type of parameters, such as but not limited to, motion; relative motion; vibration; light; touch; force; heat; biometric data (e.g., biological parameters) of a user; air quality; proximity; position; connectedness; matter type; and so on. By way of example, the sensor system 910 may include one or more of (or multiple of) an SMI sensor, heat sensor, a position sensor, a proximity sensor, a light or optical sensor (e.g., an light emitter and/or detector), an accelerometer, a pressure transducer, a gyroscope, a magnetometer, a health monitoring sensor, and an air quality sensor, and so on. Additionally, the sensor system 910 may utilize any suitable sensing technology, including, but not limited to, interferometric, magnetic, pressure, capacitive, ultrasonic, resistive, optical, acoustic, piezoelectric, or thermal technologies.

The I/O mechanism 912 may transmit or receive data from a user or another electronic device. The I/O mechanism 912 may include the electronic display 902, a touch sensing input surface, a crown, one or more buttons (e.g., a graphical user interface "home" button), one or more cameras (including an under-display camera), one or more microphones or speakers, one or more ports such as a microphone port, and/or a keyboard. Additionally or alternatively, the I/O mechanism 912 may transmit electronic signals via a communications interface, such as a wireless, wired, and/or optical communications interface. Examples of wireless and wired communications interfaces include, but are not limited to, cellular and Wi-Fi communications interfaces.

The foregoing description, for purposes of explanation, uses specific nomenclature to provide a thorough understanding of the described embodiments. However, it will be apparent to one skilled in the art, after reading this description, that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art, after reading this description, that many modifications and variations are possible in view of the above teachings.

What is claimed is:

1. A method of estimating a velocity of an object using a self-mixing interferometry (SMI) sensor including a light emitter, comprising:
    driving the light emitter with a waveform including a series of chirps, the series of chirps including,
        a first chirp and a second chirp separated by a first time interval; and
        a third chirp separated from the second chirp by a second time interval different from the first time interval;
    deriving a frequency-based velocity from an output of the SMI sensor;
    generating a first comb of possible velocities in response to analyzing an output of the SMI sensor generated in response to the first chirp and the second chirp;
    generating a second comb of possible velocities in response to analyzing an output of the SMI sensor generated in response to the second chirp and the third chirp; and
    determining the velocity of the object using the first comb of possible velocities, the second comb of possible velocities, and the frequency-based velocity.

2. The method of claim 1, wherein determining the velocity of the object using the first comb of possible velocities, the second comb of possible velocities, and the frequency-based velocity, comprises:
    identifying a third comb of possible velocities consisting of possible velocities appearing in both the first comb of possible velocities and the second comb of possible velocities; and
    identifying a possible velocity, within the third comb of possible velocities, within a predetermined range of the frequency-based velocity.

3. The method of claim 1, further comprising determining a first possible velocity in the first comb of possible velocities and a second possible velocity in the second comb of possible velocities are attributable to a possible velocity appearing in both the first comb of possible velocities and the second comb of possible velocities when the first possible velocity and the second possible velocity are within a velocity margin of error.

4. The method of claim 1, wherein the first chirp, the second chirp, and the third chirp are defined by one of rising edges of the waveform or falling edges of the waveform.

5. The method of claim 1, wherein:
    the first chirp, the second chirp, and the third chirp are defined by rising edges of the waveform;
    the series of chirps further includes,
        a fourth chirp and a fifth chirp separated by the first time interval; and
        a sixth chirp separated from the fifth chirp by the second time interval; and
    the method further comprises,
        generating a third comb of possible velocities in response to analyzing an output of the SMI sensor generated in response to the fourth chirp and the fifth chirp;
        generating a fourth comb of possible velocities in response to analyzing an output of the SMI sensor generated in response to the fifth chirp and the sixth chirp; and
        further determining the velocity of the object using the third comb of possible velocities and the fourth comb of possible velocities.

6. The method of claim 5, wherein determining the velocity of the object using the first comb of possible velocities, the second comb of possible velocities, the third comb of velocity possibilities, the fourth comb of velocity possibilities, and the frequency-based velocity, comprises:
    identifying a fifth comb of possible velocities consisting of possible velocities appearing in both the first comb of possible velocities and the second comb of possible velocities;
    identifying a first possible velocity, within the fifth comb of possible velocities, that is within a predetermined range of the frequency-based velocity;
    identifying a sixth comb of possible velocities consisting of possible velocities appearing in both the third comb of possible velocities and the fourth comb of possible velocities;
    identifying a second possible velocity, within the sixth comb of possible velocities, that is within the predetermined range of the frequency-based velocity; and
    determining the velocity of the object using the first possible velocity and the second possible velocity.

7. The method of claim 1, further comprising:
    deriving the frequency-based velocity of the object from a portion of the output of the SMI sensor that includes a response to a DC portion of the waveform.

8. An electronic device, comprising:
    a housing;
    a self-mixing interferometry (SMI) sensor mounted to the housing and having a light emitter configured to emit a beam of light from a resonant cavity of the light emitter, receive a returned portion of the beam of light into the resonant cavity, and produce an SMI signal indicative of a mixing of light within the resonant cavity;
    a drive circuit operable to drive the light emitter with a chirped waveform; and
    a processor configured to,
        derive a frequency-based velocity of an object from the SMI signal;
        use first portions of the SMI signal containing a response to a first pair of chirps in the chirped waveform, the first pair of chirps separated by a first time interval, to measure a first phase difference between the chirps and generate a first comb of possible velocities of the object;
        use second portions of the SMI signal containing a response to a second pair of chirps in the chirped waveform, the second pair of chirps separated by a second time interval, to measure a second phase difference between the chirps and generate a second comb of possible velocities of the object; and
        determine a velocity of the object using the first comb of possible velocities, the second comb of possible velocities, and the frequency-based velocity.

9. The electronic device of claim 8, wherein determining the velocity of the object using the first comb of possible velocities, the second comb of possible velocities, and the frequency-based velocity, comprises:
    identifying a third comb of possible velocities consisting of possible velocities appearing in both the first comb of possible velocities and the second comb of possible velocities; and
    identifying a possible velocity, within the third comb of possible velocities, within a predetermined range of the frequency-based velocity.

10. The electronic device of claim 9, wherein the processor is configured to determine a first possible velocity in the first comb of possible velocities and a second possible velocity in the second comb of possible velocities are attributable to a possible velocity appearing in both the first comb of possible velocities and the second comb of possible velocities when the first possible velocity and the second possible velocity are within a velocity margin of error.

11. The electronic device of claim 8, wherein both the first pair of chirps and the second pair of chirps are defined by one of rising edges of the chirped waveform or falling edges of the chirped waveform.

12. The electronic device of claim 8, wherein:
both the first pair of chirps and the second pair of chirps are defined by rising edges of the chirped waveform; and
the processor is configured to,
use third portions of the SMI signal containing a response to a third pair of chirps in the chirped waveform, the third pair of chirps defined by falling edges of the chirped waveform, to measure a third phase difference between the chirps and generate a third comb of possible velocities of the object; and
further determine the velocity of the object using the third comb of possible velocities.

13. The electronic device of claim 8, wherein:
both the first pair of chirps and the second pair of chirps are rising edges of the chirped waveform;
a third pair of chirps and a fourth pair of chirps in the chirped waveform are falling edges of the chirped waveform and
the processor is configured to,
use third portions of the SMI signal containing a response to a third pair of chirps, the third pair of chirps separated by the first time interval, to measure a third phase difference between the chirps and generate a third comb of possible velocities of the object;
use fourth portions of the SMI signal containing a response to the fourth pair of chirps, the fourth pair of chirps separated by the second time interval, to measure a fourth phase difference between the chirps and generate a fourth comb of possible velocities of the object; and
further determine the velocity of the object using the third comb of possible velocities and the fourth comb of possible velocities.

14. The electronic device of claim 13, wherein determining the velocity of the object using the first comb of possible velocities, the second comb of possible velocities, the third comb of velocity possibilities, the fourth comb of velocity possibilities, and the frequency-based velocity, comprises:
identifying a fifth comb of possible velocities consisting of possible velocities appearing in both the first comb of possible velocities and the second comb of possible velocities;
identifying a first possible velocity, within the fifth comb of possible velocities, within a predetermined range of the frequency-based velocity;
identifying a sixth comb of possible velocities consisting of possible velocities appearing in both the third comb of possible velocities and the fourth comb of possible velocities;
identifying a second possible velocity, within the sixth comb of possible velocities, within the predetermined range of the frequency-based velocity; and
determining the velocity of the object using the first possible velocity and the second possible velocity.

15. The electronic device of claim 8, wherein the chirped waveform comprises a set of triangular bursts.

16. The electronic device of claim 15, wherein:
the chirped waveform comprises a first triangular burst, a second triangular burst, and a third triangular burst;
the first time interval is defined between corresponding portions of the first triangular burst and the second triangular burst; and
the second time interval is defined between corresponding portions of the second triangular burst and the third triangular burst.

17. The electronic device of claim 8, wherein the processor derives the frequency-based velocity of the object from a portion of the SMI signal that includes a response to a DC portion of the chirped waveform.

18. The electronic device of claim 8, further comprising:
a crown attached to the housing; wherein,
the SMI sensor is positioned to emit light toward or adjacent the crown; and
the processor is configured to change a state of the electronic device in response to an amplitude and a direction of the velocity of the object.

19. The electronic device of claim 8, further comprising:
a display viewable through a surface of the housing; wherein,
the processor is configured to scroll content displayed on the display in response to an amplitude and a direction of the velocity of the object.

20. The electronic device of claim 8, wherein:
the housing is an earbud housing;
the object is a fingertip;
the electronic device comprises a speaker mounted to the housing; and
the processor is configured to adjust a volume of the speaker in proportion to an amplitude and a direction of the velocity of the object.

* * * * *